US010100742B2

(12) United States Patent
Pearce et al.

(10) Patent No.: US 10,100,742 B2
(45) Date of Patent: Oct. 16, 2018

(54) DRAINAGE METHOD AND PURGE COLLECTOR OF A CARBURATION SYSTEM OF A HELICOPTER

(71) Applicant: SAFRAN HELICOPTER ENGINES, Bordes (FR)

(72) Inventors: Simon Pearce, Assat (FR); Bernard Lavie-Cambot, L'Hopital d'Orion (FR); Hubert Moebs, Fort Worth, TX (US)

(73) Assignee: SAFRAN HELICOPTER ENGINES, Bordes (FR)

( * ) Notice: Subject to any disclaimer, the term of this patent is extended or adjusted under 35 U.S.C. 154(b) by 706 days.

(21) Appl. No.: 14/423,524

(22) PCT Filed: Aug. 27, 2013

(86) PCT No.: PCT/FR2013/051976
§ 371 (c)(1),
(2) Date: Feb. 24, 2015

(87) PCT Pub. No.: WO2014/033400
PCT Pub. Date: Mar. 6, 2014

(65) Prior Publication Data
US 2015/0184592 A1    Jul. 2, 2015

(30) Foreign Application Priority Data

Aug. 30, 2012  (FR) .................................... 12 58120

(51) Int. Cl.
*F02C 7/232*    (2006.01)
*B64D 37/32*    (2006.01)
(Continued)

(52) U.S. Cl.
CPC ............ *F02C 7/232* (2013.01); *B64D 37/005* (2013.01); *B64D 37/32* (2013.01); *B64D 37/34* (2013.01); *F02C 7/22* (2013.01)

(58) Field of Classification Search
CPC . F02C 7/232; F02C 7/22; B64D 37/34; B64D 37/005; B64D 37/32
(Continued)

(56) References Cited

U.S. PATENT DOCUMENTS 2,446,013 A * 7/1948 Kuyper ................... F02C 7/232
114/20.2
2,814,931 A * 12/1957 Johnson ................. F02C 7/232
60/39.094
(Continued)

FOREIGN PATENT DOCUMENTS

EP        2572919 A1 *  3/2013  ........... B60K 15/035
GB        742 485        12/1955

OTHER PUBLICATIONS

International Search Report dated Nov. 21, 2013 in PCT/FR13/051976 Filed Aug. 27, 2013.

*Primary Examiner* — Jason Newton
(74) *Attorney, Agent, or Firm* — Oblon, McClelland, Maier & Neustadt, L.L.P.

(57) ABSTRACT

A helicopter engine collector includes an external longitudinal wall and two closed end walls, a longitudinal symmetry axis inclined ascendingly, couplings configured to be connected to purge drains, and a connection connected to a gas ejection pipe and connected to the bottom end wall. The collector also includes, in its internal space, a chamber with its symmetry axis substantially parallel to the axis of the collector. The chamber includes a longitudinal wall and two transverse end walls. The chamber is connected to the purge coupling of the injection wheel via a radial connection emerging on its longitudinal wall, the symmetry axis of the (Continued)

chamber being inclined, with respect to the horizontal reference ground when the helicopter is in a ground position, by a reference angle such that this axis is situated parallel to the reference ground when the helicopter is in an acceleration phase. The collector prevents formation of fumes.

6 Claims, 2 Drawing Sheets

(51) Int. Cl.
    *F02C 7/22*         (2006.01)
    *B64D 37/00*      (2006.01)
    *B64D 37/34*      (2006.01)

(58) Field of Classification Search
    USPC .................................. 60/39.094, 779; 141/65
    See application file for complete search history.

(56) References Cited

U.S. PATENT DOCUMENTS

| | | | | |
|---|---|---|---|---|
| 2,949,736 A * | 8/1960 | Rubbra | ...................... | F23R 3/60 |
| | | | | 60/39.094 |
| 3,371,482 A * | 3/1968 | Camboulive | ............ | F02C 7/232 |
| | | | | 60/39.094 |
| 3,808,796 A * | 5/1974 | Spears, Jr. | ................. | F02C 3/14 |
| | | | | 137/512 |
| 3,841,089 A * | 10/1974 | Clark | ...................... | F02C 7/232 |
| | | | | 137/202 |
| 3,901,025 A * | 8/1975 | Bryerton | ................... | F02C 7/22 |
| | | | | 60/39.094 |
| 4,149,372 A * | 4/1979 | Gavin | ...................... | F02C 7/232 |
| | | | | 417/395 |
| 5,095,694 A * | 3/1992 | Shekleton | ............... | F02C 7/232 |
| | | | | 60/39.094 |
| 5,117,876 A * | 6/1992 | Kuntz | ....................... | B64F 1/28 |
| | | | | 141/231 |
| 5,996,938 A * | 12/1999 | Simonetti | .............. | B64C 1/1453 |
| | | | | 244/129.1 |
| 6,442,925 B1 * | 9/2002 | Dalton | .................... | F02C 7/232 |
| | | | | 60/39.094 |
| 8,528,315 B2 * | 9/2013 | Smith | ................... | F16K 49/005 |
| | | | | 137/382 |
| 9,624,835 B2 * | 4/2017 | Carpenter | ............. | F01D 17/141 |
| 9,718,531 B2 * | 8/2017 | Gaudreau | ............ | B64C 1/1453 |
| 2003/0110775 A1 | 6/2003 | Wernberg | | |
| 2010/0132368 A1 | 6/2010 | Lawrence et al. | | |
| 2015/0285149 A1 * | 10/2015 | Nguyen | ................... | F02C 7/232 |
| | | | | 60/39.094 |
| 2016/0003107 A1 * | 1/2016 | Braun | ....................... | F16T 1/12 |
| | | | | 60/39.094 |
| 2016/0159454 A1 * | 6/2016 | Fietz | ...................... | F16L 37/084 |
| | | | | 244/129.1 |

\* cited by examiner

DRAINAGE METHOD AND PURGE COLLECTOR OF A CARBURATION SYSTEM OF A HELICOPTER

TECHNICAL FIELD

The invention relates to a method for draining the carburation system of a helicopter, to a helicopter purge collector capable of implementing this method, and to a helicopter engine equipped with such a collector.

Helicopter engines are in general purged during stoppages in order to prevent carbonisation of the fuel that would be promoted by the residual heat. The purged fuel is stored and then ejected into the pipes when the engines are restarted for the following mission.

The architecture of each engine conventionally comprises a combustion chamber into which the fuel is injected via an injection wheel. The combustion chamber is vented to air via a drain that is also purged at its inlet.

PRIOR ART

Currently, the fuel purged when the engines are stopped is sent into a purge drain collector. The collector also receives the purge (comprising water condensates, impurities, etc.) from the venting drain of the combustion chamber. When the engine is restarted, the fuel, condensates and impurities from the collector are sucked into the engine exhaust pipe and ejected.

Ejection into the pipe causes combustion of the fuel and impurities as well as vaporisation of the water condensates. This combustion and vaporisation generate a visible fume cloud, coming in particular from the second engine, which starts substantially more quickly than the first and therefore more rapidly aspirates the purged fuel. The presence of this fume cloud is not acceptable since it could suppose a malfunctioning of the engines.

To remedy this problem, effecting a return of the fuel to the tank has been envisaged. This solution is not viable since the high temperature of the purged fuel and its volume (in particular in the event of failure of the ejection valve) are incompatible with the plastics material normally used in the pipework for venting the fuel tank. In addition, the connection between the collector and the tank poses problems of selectivity and compatibility (pressurisation, pollution by the hot gases, etc.).

DISCLOSURE OF THE INVENTION

The invention aims to prevent the formation of fumes at least when the engines are restarted, while dispensing with the drawbacks of the prior art. To do this, provision is made for trapping the fuel purged when the engine is stopped and for draining it during the start of the following flight, profiting from the inclination of the helicopter.

More precisely, the subject matter of the present invention is a method for draining a helicopter engine in which the fuel, purged when the engine is shut down, is collected in a purge collector connected to the gas ejection pipe. The fuel is transmitted to a chamber of the collector closed at a bottom end and open at its opposite end situated towards the front of the helicopter. The chamber has, with respect to the horizontal reference ground and when the helicopter is in the ground position, a positive reference inclination ascending from its bottom end towards its open end situated towards the front of the helicopter, the chamber being conformed in terms of size and inclination so as to trap the purged fuel in this chamber. During the engine restart phase, the purged fuel remains trapped without flowing into the ejection pipe. During the takeoff and then acceleration phases, the inclination of the helicopter changes from substantially zero to gradually negative. The chamber is also conformed in terms of size and inclination so that, following the variations in inclination of the helicopter during these takeoff and then acceleration phases, the fuel begins to flow from the chamber to the ejection pipe first of all slowly and then progressively accelerating until the chamber is emptied, which prevents the appearance of significant fumes in the start-up, takeoff and start-of-acceleration phases because of this progressiveness.

According to particular embodiments:
- the reference inclination angle of the chamber is determined according to the angle of inclination of the helicopter on the ground and a nominal inclination of the helicopter in the acceleration phase with respect to the horizontal reference ground so that the chamber has, in the acceleration phase of the helicopter, an inclination in a range situated around zero degrees with respect to the horizontal reference ground;
- the reference inclination of the chamber is predefined in a given range so that the inclination of the chamber in the acceleration phase with respect to the reference ground is situated in a range of ±5°;
- the flow of fuel poured from the chamber in the direction of travel of the helicopter is achieved by a return in the opposite direction to the direction of pouring into the collector from the open end of the chamber towards the ejection pipe.

The invention also relates to a helicopter purge collector capable of implementing the above method. Such a collector comprises a roughly cylindrical external longitudinal wall delimited transversely by two closed end walls, a longitudinal symmetry axis inclined ascendingly from the so-called bottom end wall situated closest to the horizontal reference ground when the helicopter is placed in the ground position, at least one coupling intended to be connected to the fuel injection wheel purge drain in a combustion chamber of the engine, and a connection intended to be connected to a gas ejection pipe connected to the bottom end wall. The collector defines an internal space in which there is arranged a chamber with a roughly cylindrical shape and a symmetry axis substantially parallel to the axis of the collector. The chamber has a longitudinal wall and two transverse end walls, a first wall and a bottom wall, the bottom wall being situated closer to the reference ground than said first wall when the helicopter is in the ground position, as well as an opening formed close to this first wall. The chamber is connected to the purge coupling of the injection wheel via a radial connection emerging on its longitudinal wall, and its symmetry axis is inclined with respect to the reference ground when the helicopter is in the ground position by a reference angle such that the symmetry axis can be situated substantially parallel to the reference ground when the helicopter is in the acceleration phase.

According to advantageous embodiments:
- the axis of the chamber is inclined by a relative angle fixed between +5° and +10° with respect to a principal axis of the helicopter defining the inclination of the helicopter with respect to the horizontal reference ground;
- the radial connection of the purge drain coupling of the injection wheel emerges closer to the first wall than to the bottom wall of the chamber, in order to facilitate filling;

the chamber has a cylindrical shape with a circular cross section;

the chamber has a volume more than twice as great as the volume of fuel that can be trapped in the chamber, in order to cover particular cases of filling such as an aborted start-up or incomplete drainage during a flight.

PRESENTATION OF THE DRAWINGS

Other data, features and advantages of the present invention will become apparent upon reading the following non-limiting description, with reference to the accompanying drawings, in which, respectively:

DETAILED DESCRIPTION

Unless indicated to the contrary, the inclinations mentioned in the present text are measured with respect to a ground "$S_0$" which is a reference ground situated in a horizontal plane with respect to the Earth's gravitational field.

Figure 1:
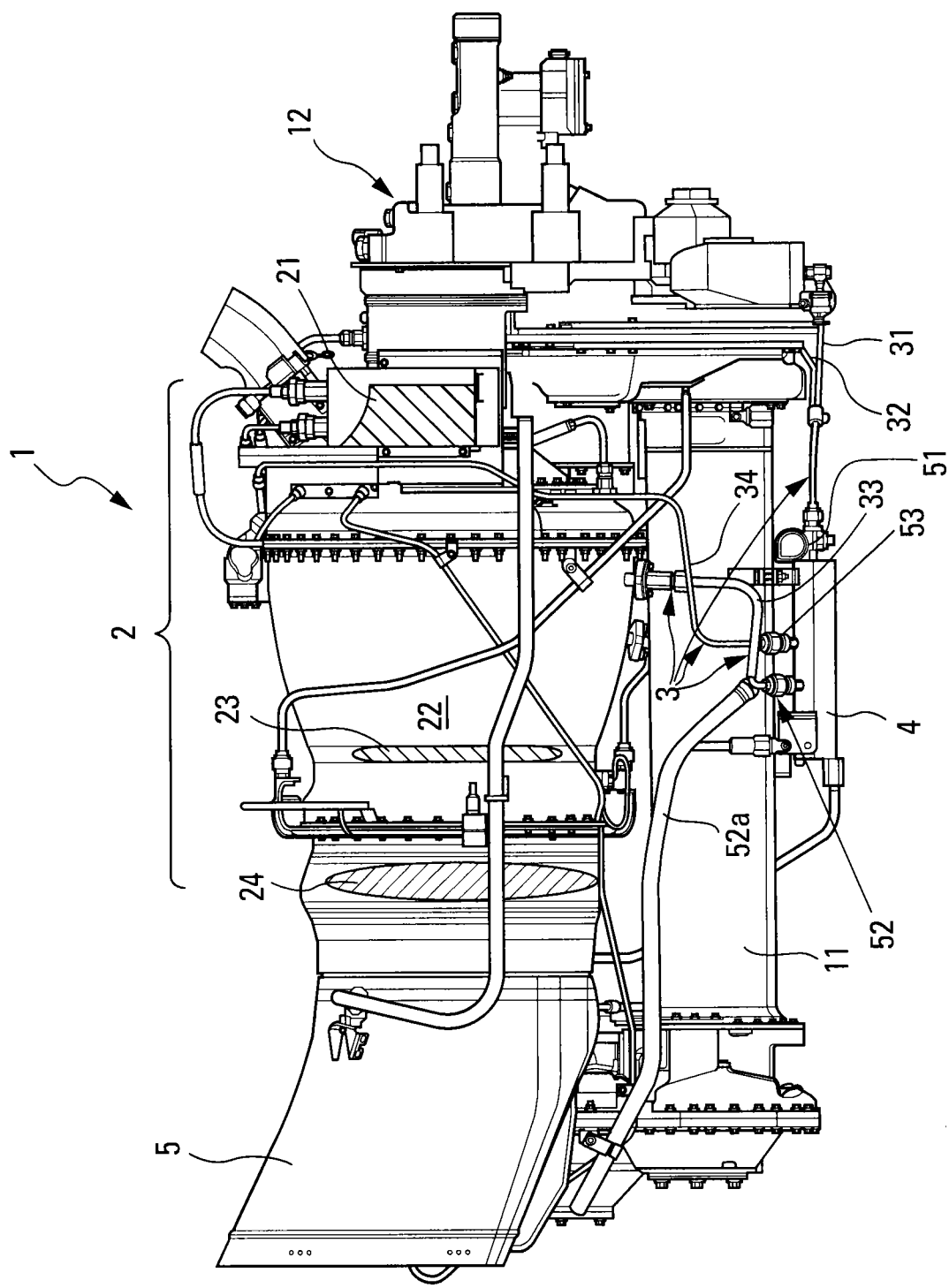
FIG. 1 is a side view which is transparent in part of a helicopter engine with its drainage system.

With reference to the side view in FIG. 1, a helicopter engine 1 comprises (seen in a cutaway view) a gas generator 2, formed of a compressor 21, a combustion chamber 22 and a turbine 23, connected to a free turbine 24. The free turbine 24 drives the main rotor (not shown) through a power shaft 11 via a gearbox 12. The gases issuing from the combustion are ejected into a pipe 5.

In order to make the engine clean, a drainage assembly 3 collects the residual liquids (fuel, oil, water condensates, impurities, etc.) to a collector 4. In particular, the collector stores a quantity of purged fuel during the stoppage of the engine. This assembly comprises:

oil drainage pipes 31 and 32 coming from the power shaft 11 and fuel pump 13;

a pipe 33 for draining the combustion chamber 22; and a pipe 34 for purging the fuel injection wheel in the combustion chamber 22.

The collector 4 according to the invention is detailed below with reference to the transparent side view in FIG. 2. Such a collector 4, fixed to the engine by fixing lugs 4a, 4b, comprises a cylindrical external longitudinal wall 41, with a circular cross section in the example, delimited transversely by two closed end walls 42 and 43. The longitudinal wall 41 has a longitudinal symmetry axis X'X positively inclined ascendingly from the bottom end wall 42. This bottom wall 42 is situated closer to the ground "$S_0$" than the other end wall 43 when, as in the example illustrated, the helicopter is in the idle position, placed on the ground (said to be in the "ground position").

The drainage pipes are connected to the collector via couplings (also visible in FIG. 1), respectively the coupling 51 for the oil drainage pipes 31 and 32, the coupling 52 for the pipe 33 draining the combustion chamber, and the coupling 53 for the purge pipe 34 of the injection wheel. The coupling 52 has an air vent 52a (visible in FIG. 1) for purging the excess air under overpressure in the combustion chamber. In addition, a connection pipe 54 connects the bottom end wall 42 of the collector 4 to the gas ejection pipe 5.

The longitudinal wall 41 delimits an internal space "V" in which a chamber 6 is mounted substantially at the centre of this space "V" in the example. This chamber 6 has a roughly cylindrical shape and a symmetry axis E'E, here merged with the axis X'X of the longitudinal wall 41 of the collector 4. The chamber 6 therefore has the same inclination as the collector 4. It also has a longitudinal wall 61 with a circular cross section and two transverse end walls, a first end wall 63 and a so-called bottom end wall 62. The first wall 63 is situated towards the front AV of the helicopter, and the bottom wall 62 is situated closer to the reference ground $S_0$ than the first end wall 63. In the example, the chamber 6 is fixed by its end walls 62 and 63 to the respective end walls 42 and 43 of the collector 4.

An opening in the form of a slot 8 is formed in a lower circular-sector portion of the longitudinal wall 61 of the chamber 6; the portion is said to be lower with regard to the reference ground $S_0$. The slot 8 is produced close to the first end wall 63. Alternatively, the opening 8 can be formed partially or completely at the edge of the longitudinal wall 61. In this case, the chamber may have a total opening or a first partial transverse wall that is no longer up against the end wall 43 of the collector 4.

In addition, the chamber 6 is connected to the coupling 53 of the purge pipe of the injection wheel 34 via a radial connecting conduit 64 emerging on the longitudinal wall 61. The radial connecting conduit 64 emerges closer to the open end 43 than to the closed end 42 of the chamber 4 in order to facilitate the filling of the purge fuel 7 in the chamber 6 without causing splashing of the fuel.

In the example, the inclined chamber is conformed in terms of size so that its volume "V", for example greater than 60 ml, and its length "L" are sufficient to make it possible to store approximately 30 ml of fuel when the helicopter is in the ground position, without pouring it into the collector 4 before the acceleration phase of the helicopter following takeoff.

In general terms, whether the helicopter is on the ground or in flight, the angle of inclination "A" of the axis X'X of the chamber 6 with respect to the reference ground (hereinafter referred to as the "angle of inclination of the chamber") is the sum of the angle of inclination "H" of the principal axis Y-Y of the helicopter with respect to the reference ground (hereinafter referred to as the "angle of inclination of the helicopter") and the relative angle of inclination "C" of the axis of the chamber X'X with respect to the principal axis of the helicopter Y'Y.

When the helicopter is in the ground position, the angle of inclination of the chamber "A" takes a reference value denoted "$A_0$" with respect to the reference ground. The value of this reference angle "$A_0$" depends directly on the value of the relative angle "C" of inclination of the chamber 6 with respect to the helicopter, to within a constant "$H_0$", "$H_0$" being the angle of inclination of the helicopter in the ground position. The relative angle of inclination "C" of the chamber, and therefore its reference angle of inclination "$A_0$", is such that the axis X'X of the chamber 6 can, when the helicopter is in the acceleration phase, be substantially parallel to the reference ground, and therefore at an angle of inclination "A" that oscillates around zero. This phase is described in more detail below.

In the example illustrated, the reference angle "$A_0$" is equal to 11°, the sum of the angle of inclination "$H_0$" of the helicopter in the ground position, fixed at 3°, and the relative angle of inclination "C", adjusted to 8° in the example. Preferably, the angle "C" is between +5° and +10°. This relative angle of inclination "C" is predefined according to the angle of inclination of the helicopter "H" in the acceleration phase after restarting of the engines and takeoff of the helicopter, as disclosed below with reference to FIG. 3.

When the helicopter takes off, which happens following the engine restart phase, and up to the start of the acceleration phase, the inclination of the helicopter "H" becomes substantially zero and the angle of inclination "A" becomes equal to the relative angle of inclination "C", that is to say approximately 8° in the example. The chamber 6 is conformed in terms of size—volume "V" and length "L"—and in terms of inclination "A" so that the purge fuel 7 approaches the free end wall 63 of the chamber 6, because of the change in the angle of inclination "A" from 11° to 8°, and can begin to pour slowly into the collector 4.

This is because the relative angle of inclination "C", here 8°, and therefore the inclination "A" of the chamber at takeoff, as well as the volume "V" of the chamber 6, here 70 ml, were predefined in order to assist slow pouring in the takeoff and start-of-acceleration phases, thus preventing abrupt pouring of the trapped fuel 7 into the ejection pipe via the collector 4 and the connection pipe 54. Such an abrupt pouring causes the formation of undesirable fumes at the time of takeoff, which it is precisely sought to avoid.

Figure 2:
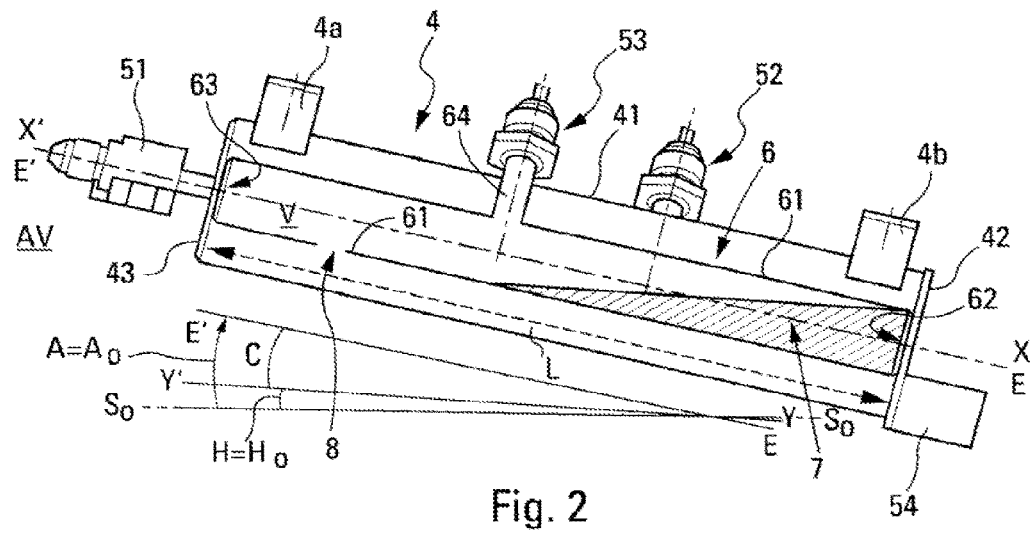
FIG. 2 is a transparent side view of a collector according to the invention when the helicopter is in the ground position.
Figure 3:
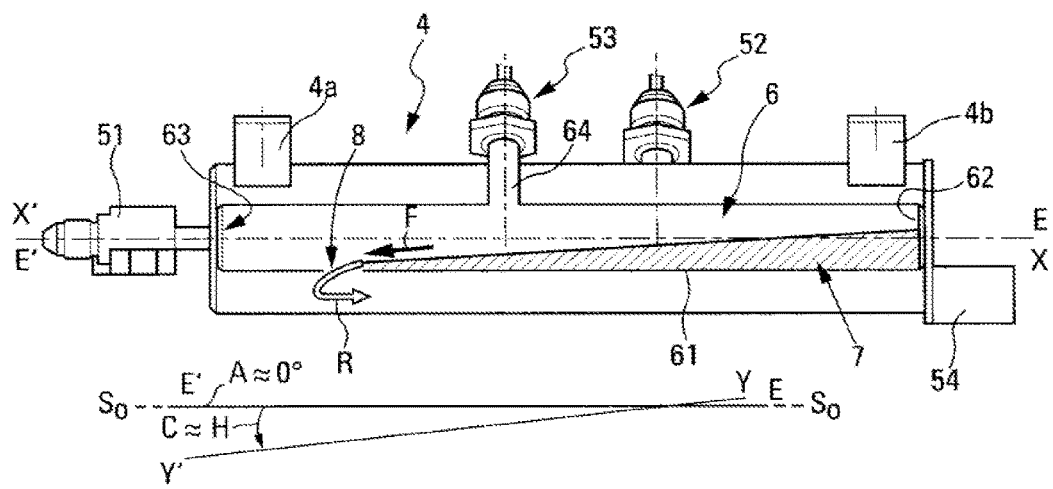
FIG. 3 is a view of the collector according to FIG. 2 when the helicopter is at the start of the acceleration phase following takeoff.

FIG. 3 illustrates a view of the collector according to FIG. 2 at the start of the acceleration phase following takeoff. In the acceleration phase, between the stationary phase and the period of stabilised flight, the helicopter "leans forward": the angle of inclination of the helicopter "H" is then negative, and may, for example, be as much as −5° and up to approximately −10° or more with respect to the reference ground.

During this acceleration phase, the fuel 7 flows more and more rapidly (arrow F) into the collector 4 as the angle of inclination of the helicopter "H" becomes more and more negative. The fuel 7 is situated in the collector, and will be sucked towards the ejection pipe 5 (FIG. 1), in a return flow (arrow R) in the collector 4 in the opposite direction to the direction of pouring (arrow F)—from the slot 8 of the chamber 6 to the connection pipe 54—and until the chamber 6 is emptied. The gradualness of suction avoids the appearance of significant fumes in the start-up, takeoff and start-of-acceleration phases of the helicopter.

The accelerated pouring results from the fact that the relative angle of inclination "C" is predefined so that the angle of inclination of the chamber "A" oscillates around zero during the acceleration phase. To do this, the relative angle of inclination "C" is adjusted—preferably between +5° and +10°, +8° in the example—in order to compensate substantially for the angle of inclination of the helicopter "H" which, in acceleration, may range from −5° and up to −10° (or more), for example −8° on average. Under these conditions, in the acceleration phase after takeoff, the angle of inclination "A" of the chamber 6 remains substantially close to zero, between +3° and −2° in the example (more generally in the range ±5° when the angle "C" is adjusted between +5° and +10°), the angle of inclination of the helicopter in the ground position "H$_0$", here 3°, being compensated for as from takeoff. Advantageously, the movement of the helicopter causes the formation of "waves" in the chamber 6, which will also assist the flow of fuel.

The present invention is not limited to the examples described and depicted. It is for example possible to provide a drainage coupling for purging the collector itself of the polluting liquids drained directly into the collector. Moreover, the form of the chamber or collector may be roughly cylindrical with an oblong polyhedral cross section. It is also possible to provide a mechanism for adjusting the angle of inclination of the collector in order to adjust it according to the principal axis of the helicopter and/or the inclination of the helicopter to be provided in the acceleration phase, for example in the context of particular search missions.

The invention claimed is:

1. A purge collector configured to be fixed to a helicopter engine, the purge collector comprising:
 a roughly cylindrical external longitudinal wall delimited transversely by two closed end walls;
 a longitudinal symmetry axis inclined ascendingly from a bottom end wall situated closest to a horizontal reference ground when a helicopter, on the engine of which the purge collector is fixed, is placed in a ground position;
 at least one coupling configured to be connected to a fuel injection wheel purge drain in a combustion chamber of the engine; and
 a connection configured to be connected to a gas ejection pipe connected to the bottom end wall;
 wherein the purge collector defines an internal space in which is arranged a chamber with a roughly cylindrical shape and a symmetry axis substantially parallel to the axis of the collector, the chamber having a longitudinal wall and two transverse end walls, a first wall and a bottom wall, the bottom wall being situated closer to the reference ground than the first wall when the helicopter, on the engine of which the purge collector is fixed, is in the ground position, and an opening formed close to the first wall; and
 wherein the chamber is connected to a purge coupling of an injection wheel via a radial connection emerging on the longitudinal wall of the chamber, the symmetry axis of the chamber being inclined, with respect to the horizontal reference ground when the helicopter, on the engine of which the purge collector is fixed, is in the ground position, by a reference angle such that the symmetry axis of the chamber is to be situated substantially parallel to the reference ground when the helicopter is in an acceleration phase.

2. The purge collector according to claim 1, wherein the symmetry axis of the chamber is inclined by a relative angle fixed between +5° and +10° with respect to a principal axis of the helicopter defining the inclination of the helicopter with respect to the reference ground.

3. The purge collector according to claim 1, wherein radial connection communicates with the purge drain coupled to an injection wheel emerges closer to the first wall than to the bottom wall of the chamber.

4. The purge collector according to claim 1, wherein the chamber has a circular cross section.

5. The purge collector according to claim 1, wherein the chamber has a size more than twice as great as a given volume of fuel corresponding to a maximum volume of fuel which can be trapped in the chamber.

6. A helicopter engine including a purge collector comprising
 a roughly cylindrical external longitudinal wall delimited transversely by two closed end walls;
 a longitudinal symmetry axis inclined ascendingly from a bottom end wall situated closest to a horizontal reference ground when a helicopter, on the engine of which the purge collector is fixed, is placed in a ground position;

at least one coupling configured to be connected to a fuel injection wheel purge drain in a combustion chamber of the engine; and a connection configured to be connected to a gas ejection pipe connected to the bottom end wall;

wherein the purge collector defines an internal space in which is arranged a chamber with a roughly cylindrical shape and a symmetry axis substantially parallel to the axis of the collector, the chamber having a longitudinal wall and two transverse end walls, a first wall and a bottom wall, the bottom wall being situated closer to the reference ground than the first wall when the helicopter, on the engine of which the purge collector is fixed, is in the ground position, and an opening formed close to the first wall; and wherein the chamber is connected to a purge coupling of an injection wheel via a radial connection emerging on the longitudinal wall of the chamber, the symmetry axis of the chamber being inclined, with respect to the horizontal reference ground when the helicopter, on the engine of which the purge collector is fixed, is in the ground position, by a reference angle such that the symmetry axis of the chamber is to be situated substantially parallel to the reference ground when the helicopter is in an acceleration phase.

\* \* \* \* \*

UNITED STATES PATENT AND TRADEMARK OFFICE
CERTIFICATE OF CORRECTION

PATENT NO. : 10,100,742 B2
APPLICATION NO. : 14/423524
DATED : October 16, 2018
INVENTOR(S) : Simon Pearce et al.

It is certified that error appears in the above-identified patent and that said Letters Patent is hereby corrected as shown below:

In the Claims

Column 6, Line 51, Claim 3 change "coupled to an injection" to --coupled to the injection--.

Signed and Sealed this
Twenty-first Day of April, 2020

Andrei Iancu
*Director of the United States Patent and Trademark Office*